4 Sheets—Sheet 1

J. A. DEAR.

FASTENING FOR PRINTING PLATES UPON CYLINDRICAL SURFACES.

No. 11,056. Reissued Jan. 21, 1890.

WITNESSES:
E. C. Rowland
H. F. Parker

INVENTOR
Joseph A. Dear
BY
Geo. W. Morris
ATTORNEY

THE NORRIS PETERS CO., PHOTO-LITHO., WASHINGTON.

J. A. DEAR.
FASTENING FOR PRINTING PLATES UPON CYLINDRICAL SURFACES.
No. 11,056. Reissued Jan. 21, 1890.
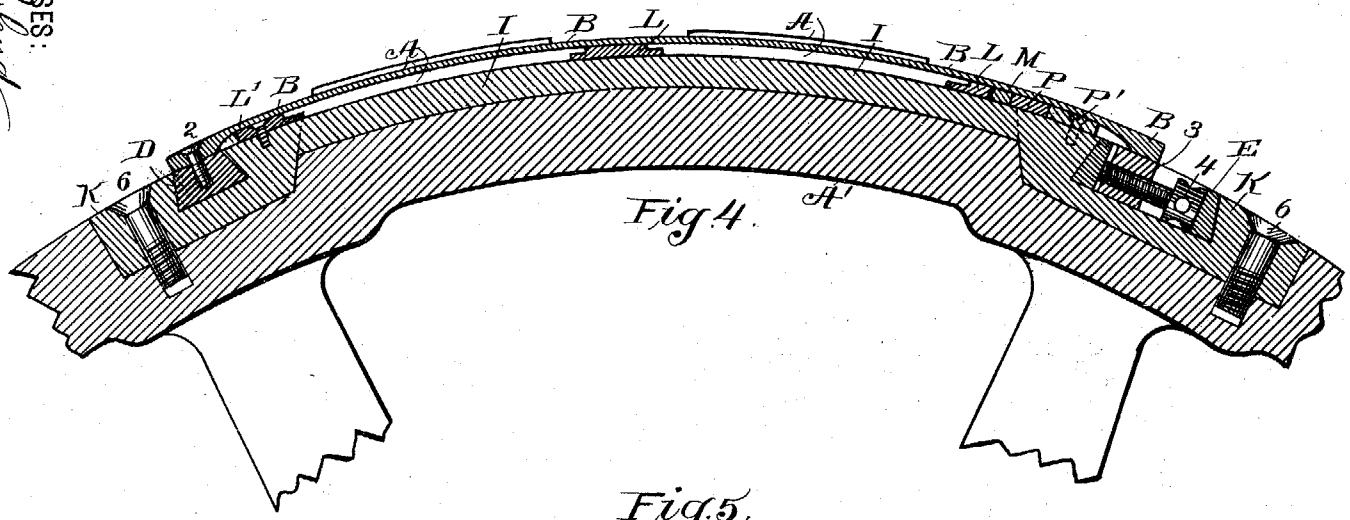
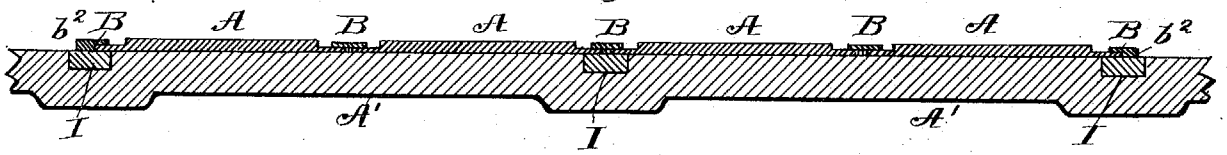
WITNESSES:
E. L. Rowland
H. F. Parker
INVENTOR
Joseph A. Dear
BY
Chas. W. Gordon
ATTORNEY
THE NORRIS PETERS CO., PHOTO-LITHO., WASHINGTON, D. C.

4 Sheets—Sheet 3.

J. A. DEAR.

FASTENING FOR PRINTING PLATES UPON CYLINDRICAL SURFACES.

No. 11,056. Reissued Jan. 21, 1890.

WITNESSES:
E. L. Rowlands
H. A. Parker

INVENTOR
Joseph A. Dear
BY
Chas. H. Forbes
ATTORNEY

THE NORRIS PETERS CO., PHOTO-LITHO., WASHINGTON, D. C.

4 Sheets—Sheet 4.

J. A. DEAR.

FASTENING FOR PRINTING PLATES UPON CYLINDRICAL SURFACES.

No. 11,056. Reissued Jan. 21, 1890.

WITNESSES:
E. F. Lowland
W. H. Parker

INVENTOR
Joseph A. Dear
BY
Chas. Morris
ATTORNEY

THE NORRIS PETERS CO., PHOTO-LITHO., WASHINGTON, D. C.

UNITED STATES PATENT OFFICE.

JOSEPH A. DEAR, OF JERSEY CITY, NEW JERSEY.

FASTENING FOR PRINTING-PLATES UPON CYLINDRICAL SURFACES.

SPECIFICATION forming part of Reissued Letters Patent No. 11,056, dated January 21, 1890.

Original No. 368,757, dated August 23, 1887. Application for reissue filed May 10, 1889. Serial No. 310,320.

*To all whom it may concern:*

Be it known that I, JOSEPH A. DEAR, of Jersey City, in the county of Hudson and State of New Jersey, have invented an Improvement in Fastenings for Printing-Plates upon Cylindrical Surfaces, of which the following is a specification.

The object of this invention is to secure stereotype, electrotype, or other printing-plates upon the type-cylinders in printing-presses so that they can be easily placed, adjusted, or changed.

Figure 1:
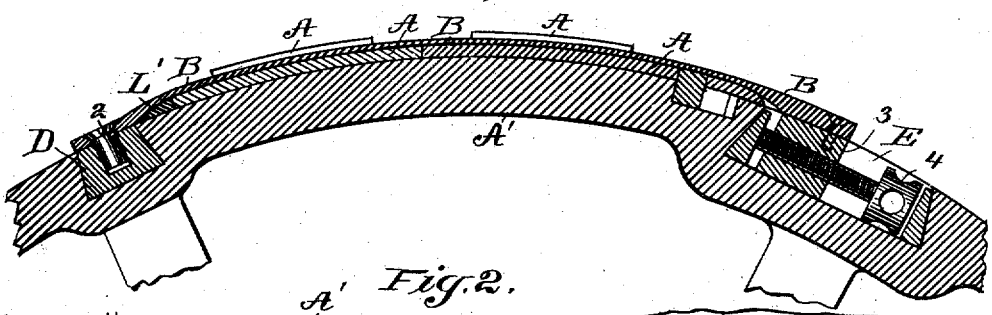
Figure 2:
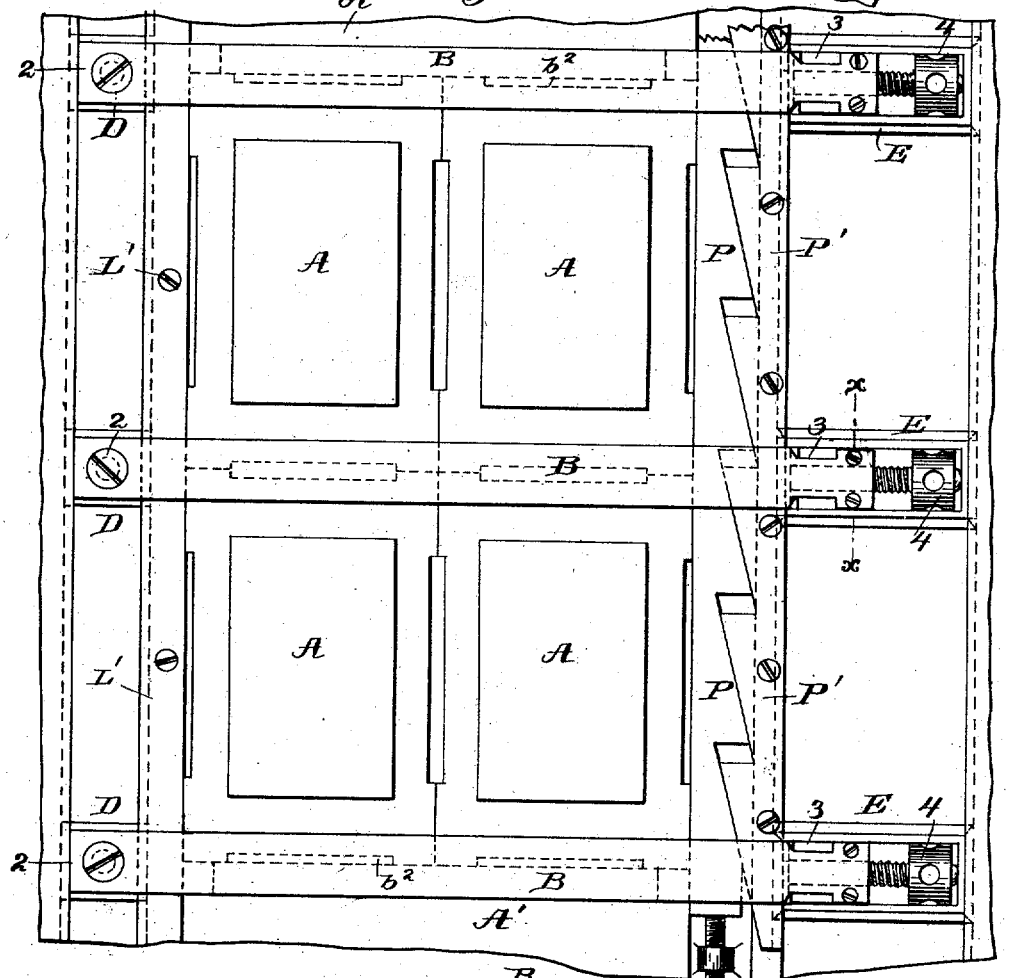
Figure 3:
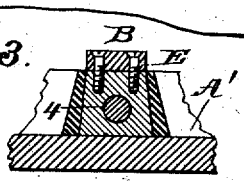
Figure 6:
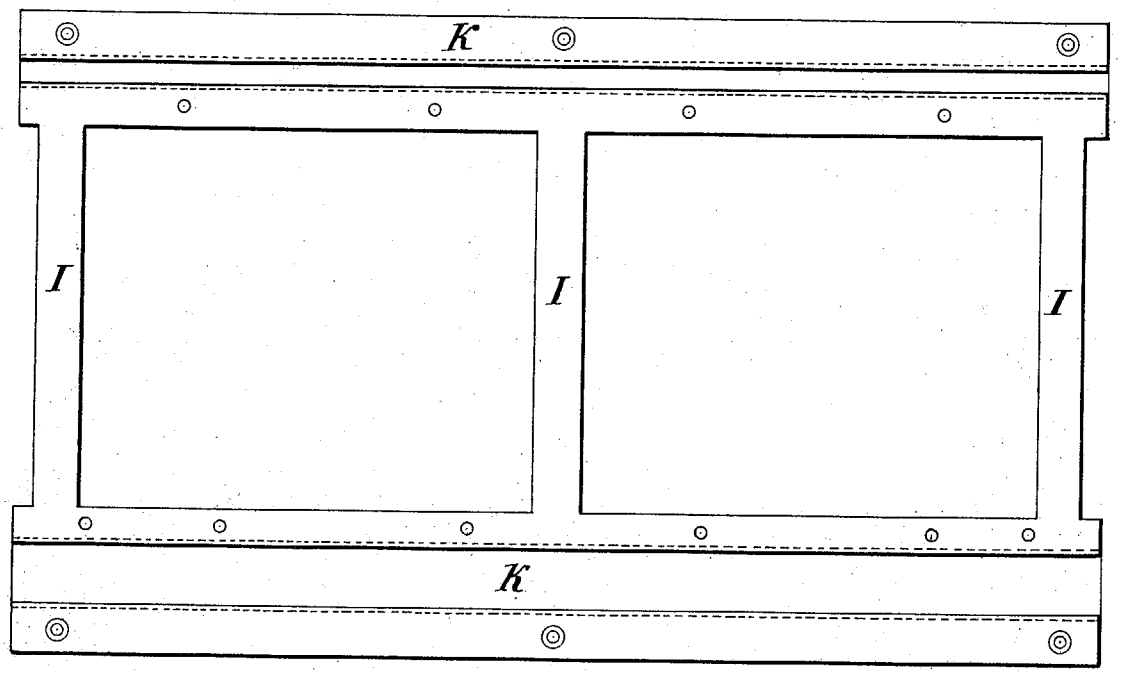
Figure 7:
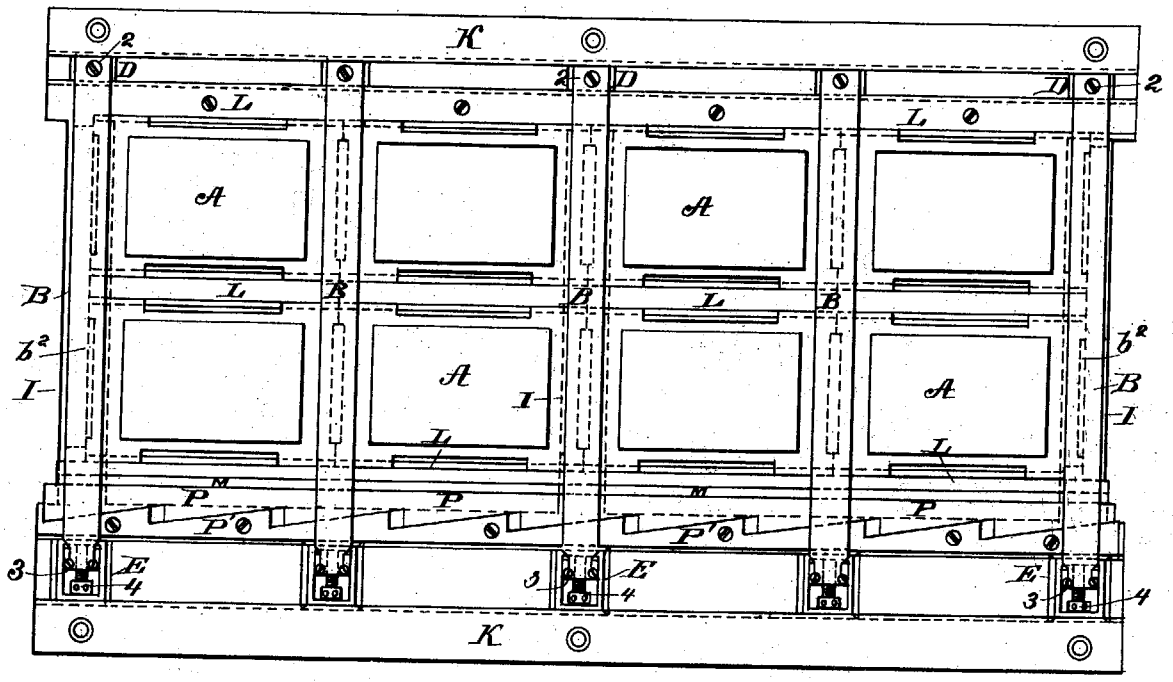

In the drawings, Figure 1 is a section of a portion of the printing-cylinder. Fig. 2 is a plan of the convex surface and the parts thereon as if laid out flat. Fig. 3 is a section at the line *x x*, Fig. 2. Fig. 4 is a section, in larger size, of a chase-frame with my improvements applied thereto. Fig. 5 is a section at right angles to Fig. 4. Fig. 6 is a plan view of the chase-frame detached; and Fig. 7 shows the chase-frame, plates, bands, and fastening devices as if laid out flat.

The stereotype or other plates A are cut to the proper size with the corners rectangular, and the middle portion of each side is cut back slightly, so that the plates will only bear one against the other edgewise at the corners, which causes the plates to set together without any risk of rocking one against the other. Each plate has a margin, the printing portion of the plate standing above the margin sufficiently for the introduction of the clamping-bands B, which are preferably of steel and are drawn sufficiently tight to bind the printing-plates firmly down to place upon the cylinder A′. In order to draw these bands tight, and also to allow for loosening the same and removing and changing the printing-plates, I provide the blocks D and E for the respective ends of each band.

One end of each band is attached firmly to one block D, preferably by a screw 2, and to obtain the necessary strength at the point of attachment the band may be thickened or widened. The other end of the band is made as a hook or catch to pass into and connect with the nut-block 3, that is within a slot in the block E, and this slot is widest at the bottom, and the nut-block fits the same, so that when the block E is in place in the printing-cylinder A′ the nut-block cannot fall out, and there is a set-screw 4, passing through the nut-block and within the slot in E, so that the band can be tightened up by turning the screw after the end of the band has been hooked upon the nut-block.

My improvement is available with a printing-cylinder or with chase-frame or a segment or turtle for the cylinder. The blocks D and E are received into grooves that run parallel to the axis of the cylinder, either in the cylinder or in the chase-frame or in the turtle, and the ends of the blocks D E should be tapering or dovetailed, so as to be held in such grooves and be adjustable longitudinally of the cylinder to bring the bands to the proper places for holding the printing-plates.

In many instances it is advantageous to lock up the plates in their proper relation to each other in a removable segmental chase, so that one chase may be lifted off the cylinder and another substituted without disturbing the adjustment of the respective plates. With this object in view I provide in the cylinder A′, or cylindrical segment, peripheral grooves at suitable distances apart for receiving the arc bars I, that are connected at their ends to the chase-bars K, so as to form a frame or chase, the cylinder A′ being channeled longitudinally to receive such bars K, and within grooves in the bars K the respective blocks D E are received. The bands B may coincide in position to the arc bars I, so as to clamp the margins of the plates to such arc bars, or the bands may be placed intermediate to the arc bars; but usually there will be but few of these arc bars—say three in each frame or chase; and to support the intermediate plates A, I make use of the parallel bars L, that cross the arc bars and are beneath the edges of the plates A, such plates being undercut or dressed off upon their under edges, so as to rest upon these parallel bars and be supported by them. These parallel bars are supported upon the arc bars, and the bands confine both the plates and the parallel bars to the arc bars.

The bar L′, adjacent to the blocks D, may be fastened to the cylinder, as shown in Figs. 1 and 2, or it may be fastened to the chase-frame, as in Figs. 4 and 7. In either instance the plates A abut against or lap upon such bar L′.

In order to be able to press the plates toward each other peripherally, I make use of the edge bars M at the opposite edge of the form to the bar L′, and this bar is parallel to the bars L, and it is between the edges of the plates A and the blocks E, and there are the wedge-shaped side-sticks P P′, that serve to lock up the printing-plates by pressing upon the edges of the same in a peripheral direction. These side-sticks may be upon the surface of the cylinder, as in Figs. 1 and 2, or upon the chase-frame, as in Figs. 4 and 7. In all instances the bands B pass across these side-sticks. If desired, the side-sticks may be made thicker at the wedge portions and be received into grooves either in the cylinder or in the chase-frame.

The chase-frame may be attached to the cylinder when in place by screws, as at 6.

The chase-frame may occupy any desired portion of the printing-cylinder and be adapted to receive any number of pages or printing-plates.

The screws $P^2$, for setting up the side-sticks, may be applied within a groove or recess in the cylinder or in the chase-frame.

The devices for confining the ends of the plates at the edges of the form may be bands that are thickened and undercut, as seen at $b^2$, Fig. 5; or strips of card-board or similar materials may be laid at the ends of the plates and confined by the bands, so as to give an even bearing for the bands, and there may be followers or screws upon the surface of the cylinder near its ends, as usual, to press the edges of the form toward each other.

I claim as my invention—

1. The combination, with the form-cylinder or turtle and printing-plates, of bands resting on the plates capable of lateral movement, with mechanism for tightening the same, substantially as set forth.

2. The combination, with the form-cylinder or turtle and printing-plates, of tightening-bands resting on such plates, and the edge bars and side-sticks, substantially as set forth.

3. The combination, with the grooved form-cylinder, of a removable chase formed of arc bars, and longitudinal bars connecting the ends of the arc bars, and tightening-bands for confining the plates, substantially as set forth.

4. The combination, with a grooved form-cylinder, of a removable chase formed of arc bars, and grooved bars connecting the ends of the arc bars, of parallel bars to receive upon them the edges of the printing-plates, tightening-bands crossing the parallel bars and resting on the margins of the printing-plates, and the edge bars and side-sticks, substantially as set forth.

5. The combination, with the form-cylinder, of curved plates provided with the requisite margins for the printed sheets and with side recesses, so that they bear at the corners only, substantially as set forth.

JOSEPH A. DEAR.

Witnesses:
CHAS. W. FORBES,
CHAS. HANIMANN.